United States Patent Office 2,892,125
Patented June 23, 1959

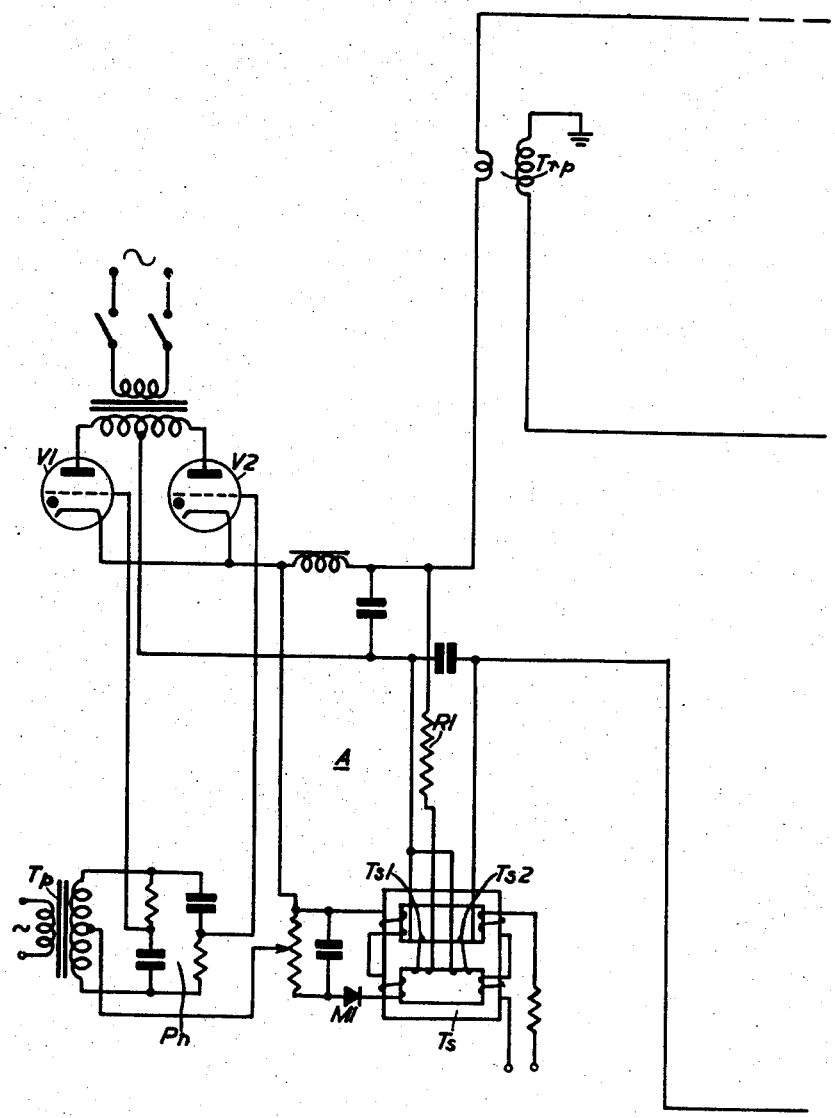
FIG. 2(i.)

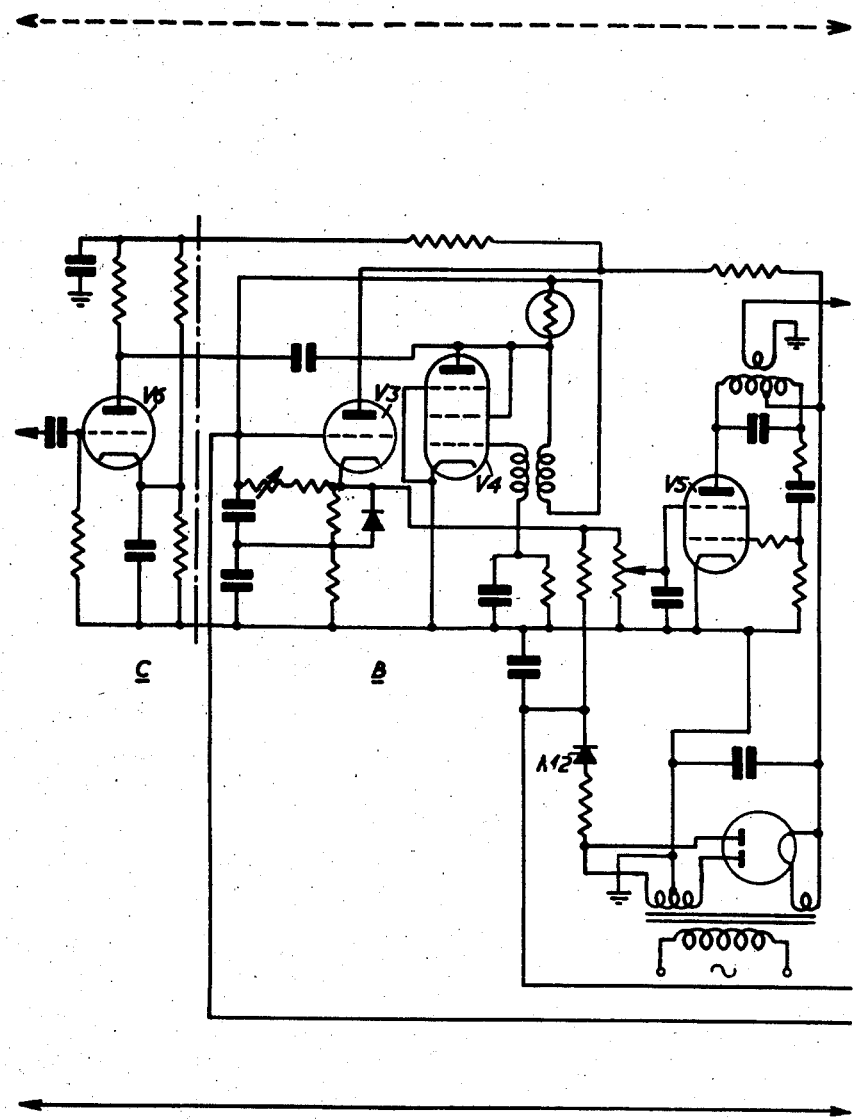
FIG. 2(ii.)

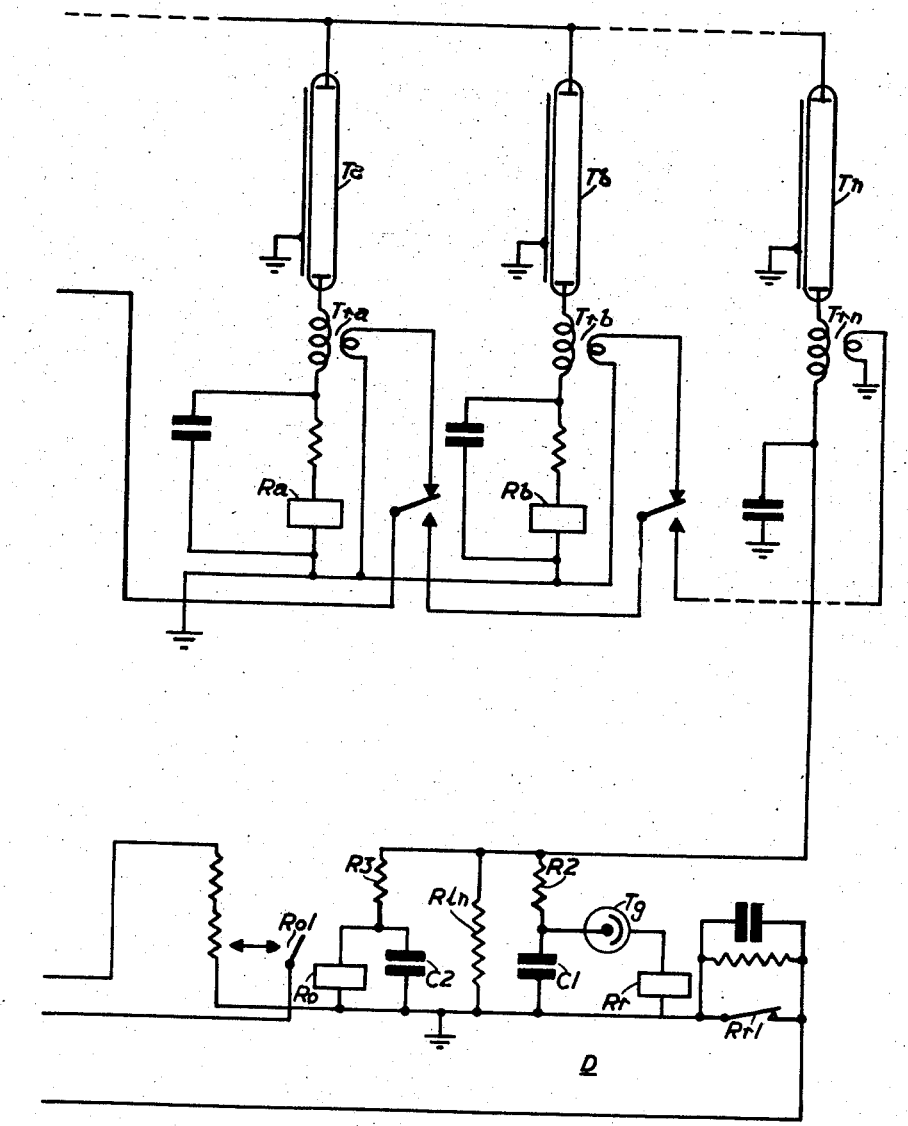
FIG (2iii)

2,892,125
ELECTRIC DISCHARGE TUBE SYSTEMS

Arthur Richard Warner, Onslow Square, London, and Derrick Arnott Ward, Addington, England Application November 14, 1956, Serial No. 622,106

Claims priority, application Great Britain November 16, 1955

7 Claims. (Cl. 315—166)

This invention relates to advertising signs, indicators and like systems incorporating gas filled electric luminous discharge tubes, in which the luminosity is periodically varied to produce an animated effect.

The present invention is concerned with improved arrangements of systems of this kind, and of current supply apparatus for supplying the tube of such systems, and the invention consists broadly of an electric discharge tube apparatus including means for applying to said tube current from a first current source and from a second, high frequency, current source, the voltage of the first source being less than that sufficient to initiate a discharge in said tube, the voltage of the currents jointly from said sources being sufficient to initiate a discharge in said tube.

The invention also includes an electric discharge tube apparatus including at least two discharge tubes, means for simultaneously applying to said tubes current from a first current source, the voltage of said source being less than that sufficient to initiate a discharge in said tube, and means for applying to said tubes at different times current from a second, high frequency, current source the voltages of said sources being jointly sufficient to initiate a discharge in said tubes.

Figure 1:
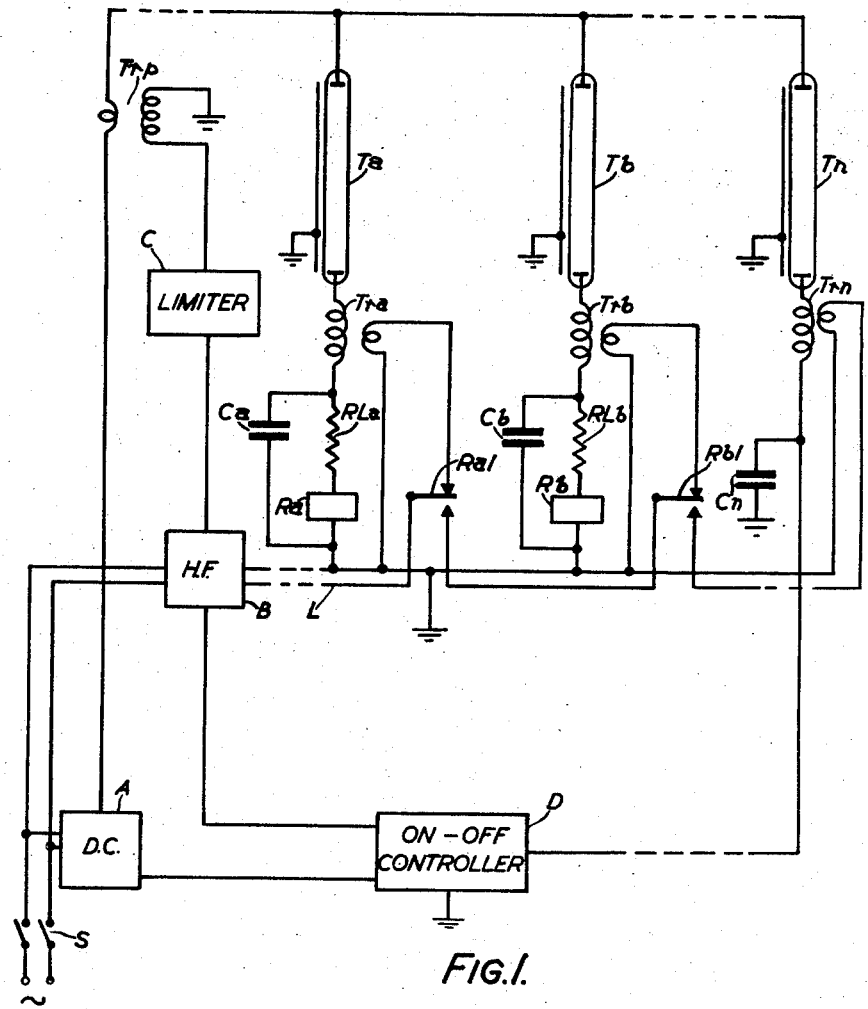
Figure 3:
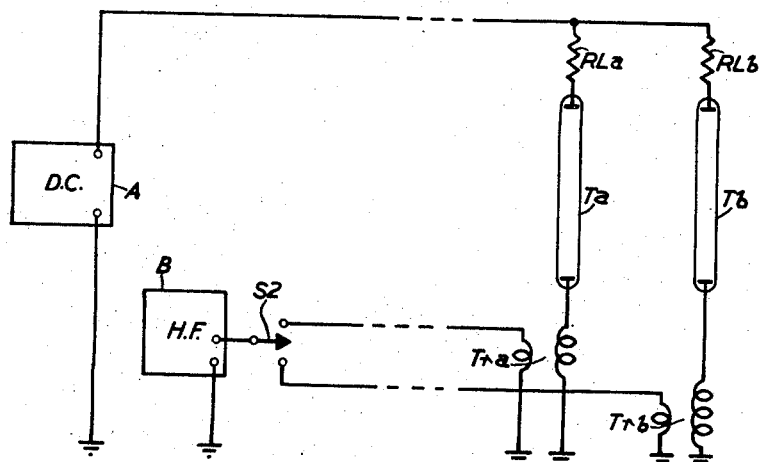
Figure 4:
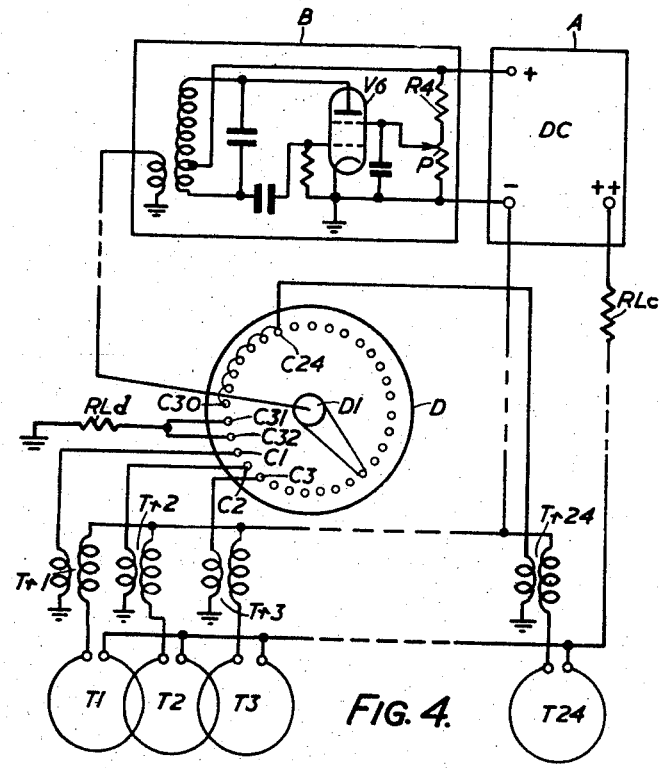
Figure 5:
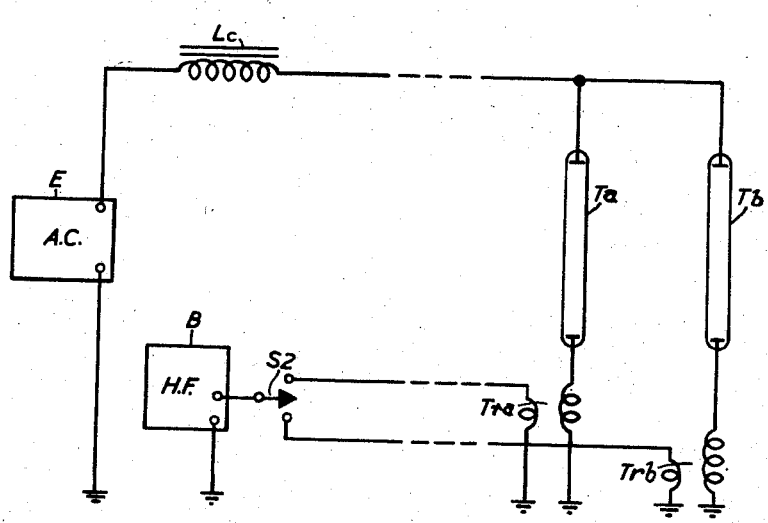

Other features and advantages of the invention will appear from the following description of embodiments thereof, given by way of example only, in conjunction with the accompanying drawings, in which:

Figure 1 is a diagram showing, in partly block schematic form, a tube system,

Figure 2, in three sections (i), (ii), (iii), is the system of Figure 1 in more detail, Figure 3 is a diagram, in partly block form, of a further embodiment, Figure 4 is a circuit diagram of a further embodiment, and Figure 5 is a circuit diagram of a further embodiment of the invention.

In the more elaborate systems of luminous discharge tubes, such as advertising signs, it is necessary to have a number of tubes and to cause different tubes to operate at different times. To do this it is necessary to use switching apparatus, and such apparatus for outdoor use has to be adequately weatherproofed; if the apparatus is installed under cover it is usually necessary to use long runs of cable, with high voltage on them. So far as we are aware, the systems so far suggested for this purpose all involve the use either of a large number of mains frequency power supply transformers, with attendant expense, or a large number of high voltage cable runs which for a reliable system must also be expensive, and which also involve the disadvantage of high voltage switches. Additionally as the complexity of the sign or the like increases, the expense of the installation rises rapidly.

In the embodiments of the invention about to be described use is made of two current supply sources, one of which is of a voltage which is by itself inadequate to cause the discharge tube to strike, and the other is a high frequency alternating current of a voltage such that the combined voltages of the two sources are sufficient to cause the tube to strike. Depending upon the nature of sign or the like the voltage of the first source can be that when the second source is removed the voltage of the first source may or may not be sufficient to maintain the discharge.

Once a tube has been lit in this way the second source can be used to light a further tube in the same way, until all the tubes of the sign are, or have been, lit. Since the second source provides a high frequency current, then any transformers that are required are much smaller and less expensive than their low frequency equivalents.

The first source can provide either a zero or low frequency, for example mains frequency, current. Where this first source is used to maintain a series of tubes once lit, the necessary power can be obtained comparatively cheaply, especially where mains frequency current is used.

In the first embodiment of the invention to be described there is provided a system of discharge tubes and the discharge is caused to progress along a first tube until that tube is wholly "lit," the discharge in that tube is maintained and the discharge is caused to progress along a second tube, and so on.

In this first embodiment to be described, a plurality of discharge tubes are used, and these tubes have applied to them a direct voltage which lies in the range between the firing and extinguishing voltages, so that the discharge cannot be initiated but can be sustained by this direct voltage. The discharges in the separate tubes can then be progressively initiated by a variable high frequency voltage superimposed on the direct voltage. As the tubes are required to be progressively "lit," in turn, the high frequency field is applied to the tubes in turn.

Referring to Figure 1, the sign tubing, of the required total length, is made up in sections $Ta$, $Tb$—$Tn$ of approximately equal length and preferably not exceeding about 8 ft., such as can easily be operated at the desired brilliance by an H.F. source of low power. All tube sections, in series respectively with current limiting resistors $RLa$, $RLb$, $RLn$, are connected in parallel across a common D.C. source A, the output voltage of which is safely below the striking voltage of the tube sections, but high enough reliably to maintain the tube current within reasonable limits, irrespective of mains voltage fluctuations. The tube sections are also in series with the secondary windings of H.F. transformers $Tra$, $Trb$, $Trn$, and, except for the last section, the coils of relays $Ra$, $Rb$, etc. which are provided with change-over contacts. The primary windings of the H.F. transformers are connected to the relay contacts as shown, so that each in turn is connected to the output of a high frequency generator B, whose output is amplitude-modulated according to a sawtooth wave form, for example a generator similar to that described in Patent No. 679,368, over a low impedance transmission line L. By-pass capacitors $Ca$, $Cb$, $Cn$ are included in the tube circuits.

On closing switch S the D.C. voltage is impressed across all tube sections, and the H.F. output begins to rise from zero. In this starting position, the H.F. output is connected to transformer $Tra$ and as the output rises from zero, the luminous column spreads gradually along tube section $Ta$ from the lower towards the upper end of the tube. When the head of the luminous column has advanced to a point near the upper end the unlit gap between the head of the column and the upper end of the tube breaks down under the field due to the impressed D.C. voltage. The rapid rise of current as D.C. breakdown occurs gives rise to a steep current pulse, which passes through the primary of the pulse transformer T$rp$. The large voltage pulse which appears at the secondary winding of transformer T$rp$ is used to cause the H.F. output to be reduced to zero; the pulse is applied, through a limiter C used to remove minor voltage variations such as those due to "random noise," to the generator B. From this instant onwards to the end of the cycle the discharge in tube section T$a$ is maintained by D.C. alone. The current of tube section T$a$ passes through the coil of relay R$a$ which operates, causing contacts R$a$1 to change over, and so to transfer the H.F. output to transformer T$rb$. The H.F. output immediately begins to rise again from zero, and in this way the cycle of operation is repeated from section to section till illumination of the last section is complete; all the tubes of the system are then illuminated by D.C. alone. They are allowed to remain illuminated for a suitable period and are then extinguished for a suitable period, after which the operation is repeated. During the "on" and "off" periods, the duration of which can be controlled by unit D, the H.F. output is held at zero.

The power units can be located in any convenient place, at considerable distance from the tubes if required. Only four wires have to be run from the power units to the sign, and only one of these wires, that supplying the D.C., has to be at high potential; no switching of the high voltage is involved. It is also an advantage that relay contacts R$a$1, R$b$1, etc. are not required to operate while carrying current.

Figure 2 shows in rather more detail the arrangement of Figure 1; in view of the general description of operation of the various units above, it will be sufficient to describe the circuits only briefly, since the detailed operation will be clear to those skilled in the art. In Figures 1 and 2 like parts bear like references.

The D.C. supply unit A has to supply a very widely varying load, represented by the successive discharge currents, and so is of good regulation. Moreover, the unit shown in Figure 2(i) is arranged so that in the event of a comparatively small increase in the mains supply voltage the relatively large change in tube current which would normally occur, due to the negative characteristics of the tubes, is obviated. The unit can then be safely operated at conditions approaching maximum output, without danger of overload.

In this unit two bi-phase thyratrons V1, V2, are used to provide the D.C. output. Rectified smoothed output is applied through a bleeder resistance R1 to a winding T$s$1 of a transformer T$s$; the transformer core is thereby magnetically saturated. The saturation is reduced in accordance with the D.C. drawn from the unit by a secondary winding T$s$2 on the transformer core.

The grids of the thyratrons have on them a bias which is A.C., due to a transformer T$p$ and a phase shifting network P$n$, and D.C. due to transformer T$s$ and rectifier M1.

The phase-shift network is adjusted so that the A.C. bias voltage leads the anode voltage of the thyratrons by an appropriate angle, enabling the thyratrons to pass current substantially during the whole of each positive half-cycle till rated maximum output is almost reached. When the negative D.C. bias superimposed on the A.C. bias exceeds a certain value the point in the cycle of the applied A.C. at which the thyratrons strike is delayed. The higher the load current the more will the transformer T$s$ be removed from saturation and the greater will be the superimposed D.C. bias, and the point at which the thyratrons start to conduct will be correspondingly delayed.

The generator B, for generating the varying H.F. output which is amplitude modulated according to a saw-tooth waveform, comprises two valves V3, V4, acting as a saw-tooth voltage generator, modulating a tetrode power oscillator valve V5; operation of the circuit is substantially as described in the prior patent referred to, but an additional connection is made to the anode, or other convenient electrode, of valve V4 from the noise filter unit C. This connection conveys the synchronising pulse from the tube circuit to the blocking oscillator V4 for the purpose of rapidly reducing the H.F. voltage to zero at the instant when each tube is struck by D.C. Further, a D.C. bias circuit, including rectifier M2 is provided for the screen grid of valve V5, to ensure that the H.F. voltage is completely reduced to zero.

The noise limiting unit C is in the form of a simple voltage amplitude limiting stage, including valve V6 which is biased beyond the point of anode current cut-off.

The "on" and "off" control unit D includes the limiting resistor RL$n$ pertaining to the last tube T$n$. The voltage drop across this resistor due to the discharge current in this tube is applied through resistor R2 to charge capacitor C1, and the voltage on the capacitor rises until the striking voltage of a small glow discharge tube T$g$ is reached.

The capacitor C1 discharges through the glow tube and through a relay R$k$; contacts R$k$1, normally closed, open in the common negative supply line to all the tubes.

The limiting resistor R1$n$ is also shunted by resistor R3 and capacitor C2, and in parallel with the latter is the winding of a relay R$o$. The contacts R$o$1 of relay R$o$, normally open, close to provide a negative bias for V3 thus holding off the oscillator valve V5, keeping the H.F. voltage at zero. During the "on" period, relay R$o$ operates before R$k$, but the sign continues to be lit until relay R$k$ operates. During this time capacitor C2 charges, and when relay R$k$ has operated there is a delay before relay R$o$ releases, permitting the cycle of operation of the sign to recommence.

The life of contacts R$k$1 can be increased by biasing the thyratrons in the power pack to cut-off, so to reduce the D.C. output to zero before contacts R$k$1 open. It is necessary, however, for the tube circuit to be open when the bias is removed and the D.C. output restored otherwise the transient surges occurring when the thyratrons first fire may result in several of the tube sections being struck. Therefore, if this method is used, contacts R$k$1 must re-close only after the bias has been removed.

A further embodiment of the invention is shown in Figures 3 and 4. In this embodiment the invention is applied to a sign or the like in which it is desired to energise a number of discharge tubes rapidly in succession, each tube being either extinguished approximately at the time that the next tube is lit or remaining lit until the end of the cycle. An example of the former is a sign in which it is desired to produce the illusion of a moving object, and of the latter a sign in which the letters of a word are successively lit.

In this embodiment the tubes are energised by a voltage which has both a direct and an alternating component control being effected by variation of the value of the alternating component. The arrangement is shown in a simple form in Figure 3. In Figure 3 tube T$a$ is supplied from a D.C. source A, in series with a limiting resistor RL$a$ and the secondary winding of an H.F. transformer T$ra$, the primary winding of which is supplied from an H.F. generator B, in series with switch S2. A second tube T$b$ is also fed with D.C. from source A, in series with limiting resistor RL$b$ and associated with a second transformer T$rb$. Switch S2 also controls the connection of transformer T$rb$ to the supply B.

Accordingly as a sequence or spelling effect is required, the value of the impressed D.C. voltage from source A is either (a) less than that required to maintain a discharge when no H.F. is superimposed, or (b) less than that required to initiate a discharge but greater than the extinction voltage when no H.F. is superimposed.

If the D.C. voltage is given a value as under (a) above, each tube will light up so long as switch S2 is closed on the appropriate contact, and extinguish when it is opened. If it is given a value as under (b), each tube will light up when the switch is closed but will remain illuminated after the switch is opened.

It will be seen that only one high voltage lead, that from unit A to the tubes, is operated at high voltage, the switching being effected over the low impedance primary windings of the transformers.

Figure 4 is a circuit diagram, showing in simplified form the arrangement of an advertising sign; the sign is intended to give the illusion of a moving ball, but as explained above, it can be readily adapted to give a "spelling" effect by variation of the applied unidirectional voltage.

Unit A is the D.C. unit and consisting of a transformer, rectifier and smoothing means is not shown in detail. Unit B is the H.F. generator and includes a screen grid valve V6 arranged as an oscillator. The screen grid voltage is made adjustable by a potentiometer P, whereby the output of the oscillator is controlable. The generator receives its anode supply from unit A.

Tubes T1 to T24 are 24 neon tubes (for simplicity only the first three and last one are shown) each bent into the form of a circle of the same size to depict a ball and suitably spaced. The tubes are all connected in parallel, each in series with the secondary of its H.F. transformer T$r$1, T$r$2, T$r$3 etc., and the parallel combination connected to the D.C. source A in series with a common limiting resistor RL$c$. The sign is controlled by a switch unit D in which a rotating arm D1 makes contact at its end with each of 32 studs $c$1 to $c$32 in turn. Arm D1 is connected to the output of the H.F. generator B over a low impedance transmission line, and studs $c$1 to $c$24 to the primary windings of transformers T$r$1 to T$r$24 respectively. Studs $c$25 to $c$30 are connected to stud $c$24. Studs $c$31 and $c$32 are connected to a dummy load RL$d$. As arm D1 passes over studs $c$1 to $c$24, the tubes T1 to T24 are rapidly switched on and off in sequence, and produce the effect of a moving ball. While the arm passes over $c$24 to $c$30 the ball appears at rest in the position of T24. When the arm passes over $c$31 and $c$32 the sign is extinguished.

When a spelling effect is required, the D.C. voltage is given an appropriate value as under (b), and the connections are the same as in Figure 4 with the exception that each tube is individually connected to the common D.C. line in series with a separate limiting resistor as described above. Tubes T1 to T24 will be switched on one after another till all are lit. If the tubes are in the form of letters to represent wording, this will therefore be spelt out.

For sequence effects the contact arm should preferably make before break, to avoid leaving the H.F. generator without a load. Ideally, make should occur at the same instant as break to avoid two adjacent tubes being simultaneously connected to the H.F. generator for appreciable time. When this occurs the two tubes are each partly lit by H.F. alone.

Alternatively, the H.F. output can be reduced to zero during the time that the moving contact is not engaging a stationary contact, for example by means of a second arm whose contact connects the screen grid of the beam tetrode oscillator valve V6 to earth during this time.

When used for sequence effects the brilliance can be controlled by varying the H.F. output by adjusting the potentiometer P. In some displays this control may be used to advantage progressively to increase or decrease the brilliance as the moving figure or object depicted moves in any particular direction, for example towards or away from the observer. To this end a second rotating contact arm can be mounted on the same spindle as the first, and the studs appertaining to this second contact, connected to resistors of different values in series with resistor R4, Figure 4.

A further embodiment of the invention suitable for sequence effects is shown in Figure 5. This embodiment of the invention closely resembles that shown in Figure 4, and differs from it principally in that instead of applying to the tubes a D.C. on which the H.F. current is superimposed, an A.C. is used. The use of A.C. for the first current source (other than A.C. of square-wave form) is best used where the voltage of this source is less than the maintaining voltage, as in sequence effects; for spelling effects the use of D.C. as the first source is preferred.

In Figure 5, the tubes T$a$ and T$b$ are connected in parallel with a source E of A.C., the tubes being connected in series with the secondary windings of H.F. transformers T$ra$ and T$rb$, similar to those of Figure 3. A source B of H.F. current controlled by switch S2 is fed to the primary windings of transformers T$ra$ and T$rb$. It is to be observed that due to the use of A.C., the limiting resistor RL$c$ of Figure 4 is replaced by a small inductor L$c$. In practice this can be formed by leakage inductance in the supply transformer.

Inasmuch as the source E may consist only of a suitable transformer fed from the mains supply, the system of Figure 5 shows a substantial saving in cost over the systems using the D.C. source.

The frequency of the high frequency source can vary widely, and can be as low as of the order of 8 to 10 kc./sec.

The embodiments of the invention described thus provide systems which avoid the use of numerous mains frequency power transformers, or long runs of a number of, high voltage cable runs; high voltage switching is avoided, and while a high frequency generator is used, the output of this generator need be no larger than that necessary to operate one length of tube, even in a multitube installation.

What is claimed is:

1. An electric discharge tube apparatus including at least first, second and third gas discharge tubes each including two electrodes between which current flow is adapted to the initiated and sustained, a first current source, the voltage of said source being less than that sufficient to initiate discharge between said electrodes, first, second and third inductively reactive elements, connecting means for connecting said first, second and third elements respectively in series circuits with said first, second and third discharge tubes and for connecting said series circuits continuously in parallel with said source, a high frequency second source, said inductively reactive elements presenting a relatively low impedance to currents from the first source and a higher impedance to currents from said high frequency second source, and switching means for effectively connecting said second source in sequence across said first, second and third inductively reactive elements thereby to apply to said first, second and third tubes in sequence a voltage sufficient to initiate discharge in said tubes in sequence.

2. An electric discharge tube apparatus as claimed in claim 1, and comprising first, second and third voltage step-up high frequency transformers, each having a primary and a secondary winding, said first, second and third inductively reactive elements including respectively the second windings of said transformers, said switching means controlling the connection of said primary windings in sequence to said high frequency second source.

3. An electric discharge tube apparatus as claimed in claim 1 and wherein the voltage from said first source applied to said tubes is less than the voltage necessary to sustain discharge in said tube, and wherein switching means are arranged effectively to disconnect said second source from said first inductively reactive element when connection of said second source to said second inductively reactive element has been established, and to disconnect said second source from said second inductive-ly reactive element when connection of said second source to said third inductively reactive element has been established.

4. An electric discharge tube apparatus including at least first, second and third gas discharge tubes each including two electrodes between which current flow is adapted to be initiated and sustained, a first current source, the voltage of such source being less than that sufficient to initiate but greater than that to maintain discharge between said electrodes, first, second and third inductively reactive elements, connecting means for connecting said first, second and third elements respectively in series circuits with said first, second and third discharge tubes and for connecting said series circuits continuously in parallel with said source, a high frequency second source, said reactively inductive elements presenting a relatively low impedance to currents from the first source and a higher impedance to currents from said high frequency second source, switching means for effectively connecting said second source in sequence across said first, second and third inductively reactive elements thereby to apply to said first, second and third tubes in sequence a voltage sufficient to initiate discharge in said tubes in sequence, the combined voltages applied to said tubes from said sources being sufficient to initiate discharge in said tubes.

5. An electric discharge tube apparatus as claimed in claim 4, wherein the voltage of said high frequency second source is variable periodically from a low value to a maximum value whereby a discharge in each said tube is caused to progress along the length thereof as the maximum value of the voltage of said second source is approached, until the combined voltages of said first and second sources in each said series circuit is sufficient to initiate discharge between the two electrodes of the tube included in that circuit.

6. An electric discharge tube apparatus as claimed in claim 4 and comprising current responsive means responding to current flow in said first discharge tube for operating said switching means.

7. An electric discharge tube apparatus as claimed in claim 6, and comprising current responsive means responding to current flow in the last of said tubes for suppressing discharge in all of said tubes.

References Cited in the file of this patent

UNITED STATES PATENTS

| | | |
|---|---|---|
| 1,023,289 | Arons et al. | Apr. 16, 1912 |
| 1,662,114 | Hotchner | Mar. 13, 1928 |
| 2,088,474 | Haller | July 27, 1937 |
| 2,252,474 | Spanner | Aug. 12, 1941 |
| 2,478,908 | Edgerton | Aug. 16, 1949 |
| 2,540,015 | Solow | Jan. 30, 1951 |
| 2,658,142 | St. John | Nov. 3, 1953 |